United States Patent [19]

Clique

[11] Patent Number: 4,948,986
[45] Date of Patent: Aug. 14, 1990

[54] ELECTRICAL FEEDING DEVICE OF A CENTRAL UNIT BY AT LEAST ONE CONTROL SIGNAL, THE SAID UNIT BEING CONNECTED WITH A RECEIVING LOCAL STATION

[75] Inventor: Jean-Michel Clique, La Celle Saint Cloud, France

[73] Assignees: Automobiles Peugeot; Automobiles Citroen, both of France

[21] Appl. No.: 296,812

[22] Filed: Jan. 12, 1989

Related U.S. Application Data

[63] Continuation of Ser. No. 27,162, Mar. 17, 1987, abandoned.

[30] Foreign Application Priority Data

Mar. 24, 1986 [FR] France ............................ 86 04192

[51] Int. Cl.⁵ .......................... G06F 15/50; H02J 1/00
[52] U.S. Cl. .............................. 307/10.1; 364/424.05; 307/10.7; 361/170
[58] Field of Search ............................ 307/10.1, 10.7; 364/424.05; 361/170

[56] References Cited

U.S. PATENT DOCUMENTS

| | | | |
|---|---|---|---|
| 4,516,034 | 5/1985 | Bier | 307/10.1 |
| 4,554,461 | 11/1985 | Oho et al. | 307/10.1 |
| 4,649,286 | 3/1987 | Takeda et al. | 307/10.1 |

FOREIGN PATENT DOCUMENTS

2445769 8/1980 France.

Primary Examiner—Eugene R. LaRoche
Assistant Examiner—Michael B. Shingleton
Attorney, Agent, or Firm—Steinberg & Raskin

[57] ABSTRACT

The present invention is generally related to an electrical feeding device of a central unit by at least one control signal. The unit is connected with at least one receiving local station and comprises, in association with the local station, a voltage dividing circuit with resistances connected in series with a feeding source through a switching element associated with the local station, and a detector of potential level at a dividing terminal of the dividing circuit generating the control signal when the switching element is closed.

16 Claims, 3 Drawing Sheets

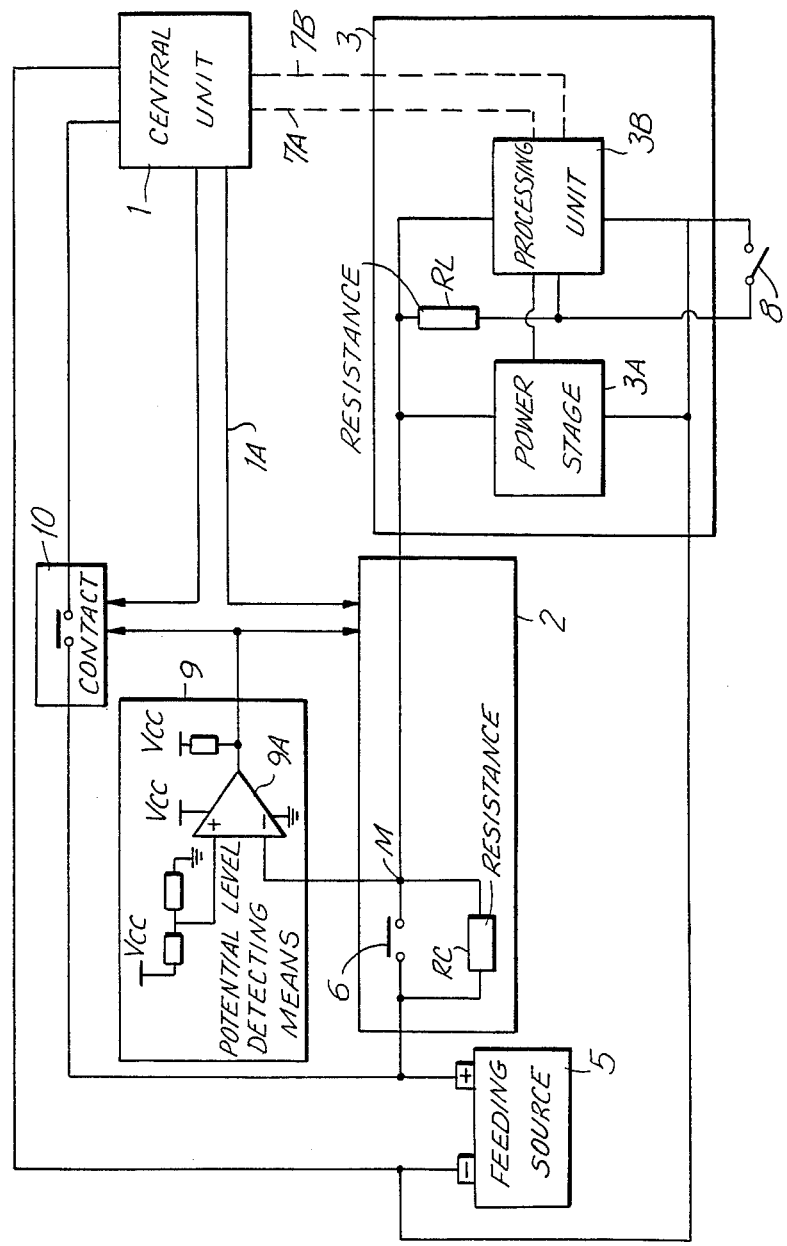

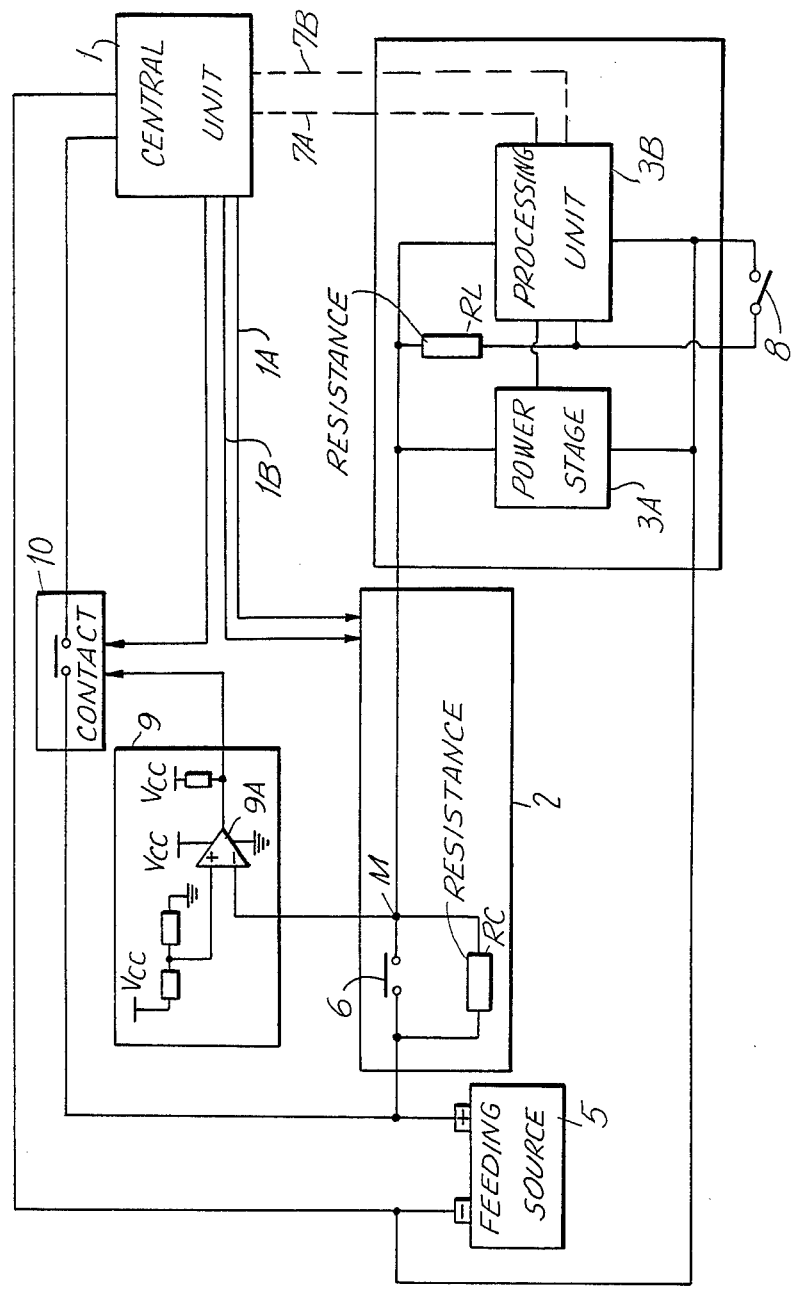

ELECTRICAL FEEDING DEVICE OF A CENTRAL UNIT BY AT LEAST ONE CONTROL SIGNAL, THE SAID UNIT BEING CONNECTED WITH A RECEIVING LOCAL STATION

This is a continuation of application Ser. No. 027,162, filed Mar. 17, 1987, now abandoned.

BACKGROUND OF THE INVENTION

The present invention concerns generally an electrical feeding device of a central unit by at least one control signal, the unit being connected with at least one receiving local station particularly for systems provided on board of vehicles.

The present invention is particularly applied in the automobile industry.

Electrical feeding devices for systems provided on board of vehicles are already known, which, when the vehicle is in the state of rest, are designed to limit at the maximum the consumption of current. As a matter of fact, without such devices, and by the prolonged stop of the vehicle, the battery runs down.

According to a known device, in the state of rest of the vehicle, the transmission frequencies of information between the managing central unit and the independent receiving local stations are slowed. With such a system, the central unit and the different local stations remain under voltage, even in the case of stop of the vehicle. So, one effectively reduces the consumption of current, but the problem of stray currents, especially in the power transistors existing within each local station, is not solved.

SUMMARY OF THE INVENTION

It is an object of the present invention to remedy these inconveniences by proposing an electrical feeding device considerably limiting the dim current to the strict minimum, in order to reduce the consumption and consequently the discharge of the battery by the prolongated stop of the vehicle, that device being developed without supplementary wiring.

To achieve this, the present invention provides an electrical feeding device of a central unit by at least one control signal, which is connected with at least one receiving local station, characterized in that it comprises in association with at least one of the local stations, a voltage dividing circuit with resistances connected in series with a supply source by the medium of a switching element associated to the local station, and means for detecting the potential level at the dividing terminal of the dividing circuit, generating the control signal when the switching element is closed.

The device according to the present invention allows the supply source to be, when the vehicle is in the state of rest, in the widest part isolated from each element liable to consume current and so discharge the battery.

According to an advantageous characteristic of the present invention, each local station comprises a processing unit connected between the dividing terminal and the supply source and likely to be fed as soon as the aforesaid control signal is emitted.

So, the system according to the present invention can operate as soon as the user solicits a function associated to one of the local stations. This function can be of the type of the unlock of the doors "carglass-raiser", alarms . . . .

BRIEF DESCRIPTION OF THE DRAWINGS

The invention will be better understood and other purposes, characteristics and advantages thereof will appear more clearly as the explanatory description proceeds with reference to the attached schematic drawings given by way of non-limiting examples only, illustrating several embodiments of the invention and wherein:

FIG. 3 is a detailed schema of the device according to the present invention for only one local station, according to the first embodiment; and FIG. 4 is a detailed schema of the device according to the second embodiment.

DESCRIPTION OF THE PREFERRED EMBODIMENTS

Figure 1:
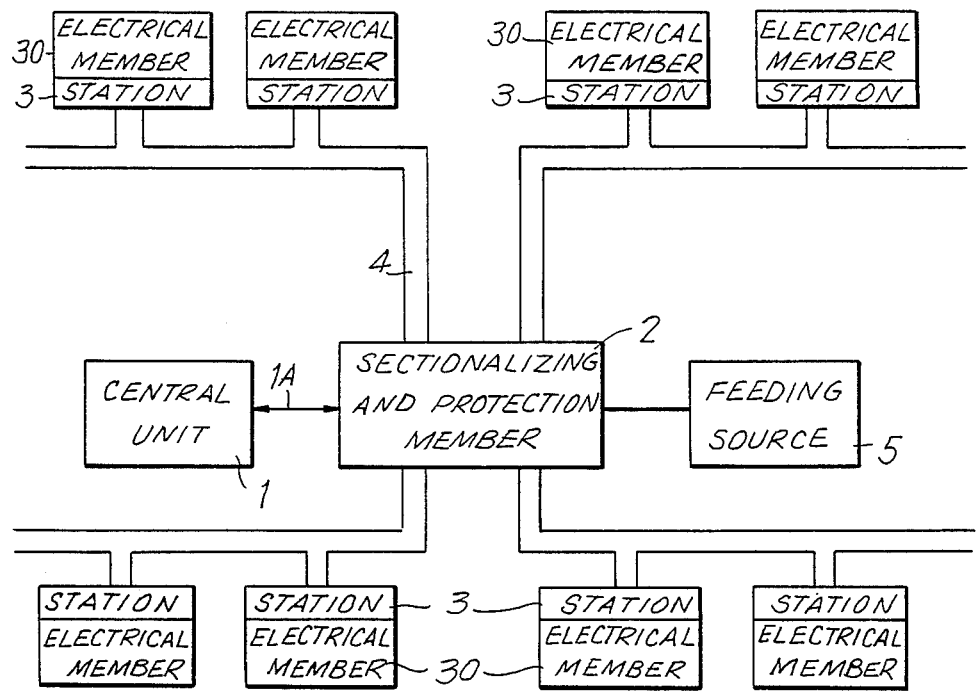
FIG. 1 is a schematic general representation of the system according to the present invention.

With reference to FIG. 1, the reference number 3 indicates different local stations to which is associated an electrical member 30 which can be, for instance the electrical member of the control of the carglass-raiser.

Each local station 3 is connected, by means of a bus power 4 with a feeding source such as a battery, indicated with 5, through the medium of a sectionalizing and protection member 2 which will be described more in details later.

A central unit 1 is also connected to the sectionalizing and protection member by one connection 1A.

Figure 2:
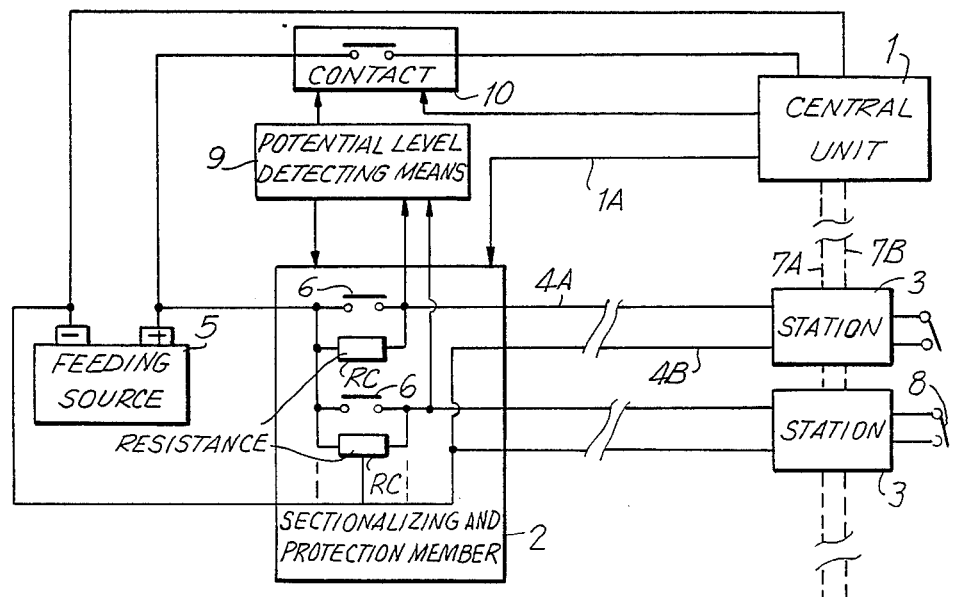
FIG. 2 represents a simplified schema of the device of feeding device according to a first embodiment.

According to FIG. 2, each local station 3 gets four connections:

two power wires 4A, 4B forming the bus of power 4, one of the two wires 4A being connected to the positive terminal of the battery 5 through the medium of relay contact 6, and the other wire 4B being connected to the negative terminal of the battery 5;

two data wires 7A, 7B providing for the connection between the central unit 1 and each local station 3.

In parallel to each relay contact 6 is connected a first resistance RC, or a group of resistances in series, that arrangement partly constituting the sectionalizing and protection member 2 here-above mentioned.

In the first embodiment represented at FIG. 2, the outputs of the sectionalizing and protection member 2 are connected to a potential level detecting means 9. The output of the detecting means 9 is connected to one input of the sectionalizing and protection member 2 and also to a relay, not represented on the figure, associated to the contact 10. This contact is mounted between the supply source 5 and the central unit 1. Moreover, the central unit 1 is connected with the first relay contact 10.

Each local station 3 is provided with a switching element 8. Referring more particularly to FIG. 3, each local station comprises a power stage 3A connected between the negative terminal of the supply source 5 and one output of the sectionalizing and protection member 2, and a processing unit 3B connected in parallel to the terminals of the power stage 3A. A second resistance RL is mounted between the first resistance RC and the switching element 8. The association of the first resistance RC and this second resistance RL makes a voltage dividing circuit with dividing terminal M.

To the dividing terminal M is connected the detecting means of the potential level 9 which can be a comparator, for instance an operational amplifier 9A or any other equivalent system.

The connection between the central unit 1 and each local station 3 or more precisely a processing unit 3B of each local station is achieved by means of a bus of multiplexed data 7A, 7B.

The central unit 1 is also connected to one input of the sectionalizing and protection member 2 through a connection 1A.

FIG. 4 is substantially equivalent to FIG. 3. Only the connections of the sectionalizing and protection member 2 with the central unit 1 and with the detecting means of potential 9 are different. As a matter of fact, according to FIG. 4, there is a double connection 1A, 1B between the outputs of the central unit and the inputs of the sectionalizing and protection member 2. On the contrary, the connection binding the output of the detecting means 9 and one input of the aforesaid member 2 no longer exists.

According to an embodiment of the device, the first relay contact 10 connected between the battery 5 and the central unit 1 can also be found within the sectionalizing and protection member 2.

Moreover, the detecting means 9 of the potential level, can be found indifferently within the central unit 1 or the sectionalizing and protection member 2.

The operation of the system will be described with reference to at first FIG. 3: when the automobile vehicle is in the state of rest, the relay contacts 6, 10 respectively connecting the supply source 5 with at least one local station and the supply source with the central unit, as well as the switching element 8 of each local station, are open. So, the central unit 1 and all the local stations 3 are disconnected from the supply source and consequently are not fed. Only the means for detecting the potential level remains fed but it consumes only a little bit of power and therefore it has not any important influence to the discharge of the battery.

In the state of rest, being given that the contact of relay 6 is open, the dividing terminal M is almost at the potential of the battery 5, the resistances RC limiting and controlling the stray current.

When the user of the automobile solicits a function, such as for instance the unlock of the doors or the antitheft alarm etc . . . , i.e. actions local station 3 the switching element 8 is closed, achieving so the connection of the local station associated with the supply source 5. So, the potential level at the terminal M falls down. The potential level detector connected at the dividing terminal compares the potential level of the dividing terminal M with a reference potential level, generally predetermined in relation to the values of the first and second resistances RC and RL. Once the fall down of the potential level at the terminal M is detected, the comparator emits then a logical control signal to control the closing of the relay contacts 6 and the closing of the relay contact 10 associated to the central unit.

At this moment, the contacts short-circuit the first resistances RC and provide the power distribution in each one of the local stations and the central unit, consequently putting the device in the state of operation: the shipped electronical system of the automobile has been awaken.

In such a device, the function of the central unit is to manage the whole local stations and communicate with each one of the stations by means of a bus of multiplexed data. Each local station is then likely to recognize the information it needs thanks to its own way of addressing.

The embodiment of FIG. 4 represents a device which substantially operates in the same way as the device represented at FIG. 3: the diference is that the control of closing of the second relay contacts 6 is achieved through the central unit 1, instead of being achieved directly by means of the potential detector. Finally, the device according to FIG. 4 operates in the following way: when the user solicits a function, the switch 8 is closed, the detecting means 9 of the potential level detects the potential drop at the terminal M and consequently, sends a control signal for closing the first relay contact 10 for feeding the central unit 1. Afterwards, the central unit sends a control signal for closing the second relay contacts 6.

In the two cases of the above-described Figures, the disfeeding of the circuits is achieved as follows: when the vehicle is in the state of rest again, the central unit 1 sends, after a predetermined time delay, a control signal for opening the second relay contacts. When these contacts are open, the central unit 1 sends a control signal for opening the first relay contact 10, so that it cuts off its own feeding. The whole device, except the detecting means of the potential level M, is then cut off or in the state of rest.

In the above-described embodiments, the voltage dividing circuit includes a first and second resistances respectively RC and RL whose ratio of the first resistance value to the second resistance value is high and preferably to about 100. In that precise case, the resistance RL can be taken at a value of 100 ohms whereas the resistance RC has a value of 10 kilo-ohms.

The voltage Vcc of the comparator can be provided by means of a Zener diode. That voltage could also be the battery voltage (by means of overvoltage protection), because the electronic detection device does not need any fixed and regulated voltage.

The electrical feeding device according to the present invention allows the restarting of the whole electronic system of the vehicle only by the monitoring of the potential level at the dividing terminal M of each power bus. It moreover allows the selective connection and disconnection of different members of the system.

It should be observed that this electrical feeding device adapted to any multiplexing system in a vehicle can equally be applied to an unmultiplexed electrical installation.

In conclusion, the device according to the present invention solves the problem of the limiting of consumption of the electronical system provided in a vehicle, when the latter is in the state of rest while allowing the immediate operation of each one of the functions, as soon as one of them is interrogated or solicited.

What is claimed is:

1. Electrical energy feeding device for feeding electrical energy to a system mounted on board a vehicle and comprising a central control unit and a plurality of local stations each connected to said central unit and controlled thereby and to each station being associated means for controlling a working device such as an accessory device of the vehicle such as a car glass riser, each local station being connected to said central unit by a date bus and being provided with an address to allow said central unit to communicate with said local station for putting the latter into condition to control the working device which is associated to said local station to accomplish a function, said central unit and each said local station being coupled to an electrical energy feeding source such as a battery of the vehicle, by a respective power bus, first switching means being mounted in each said power bus connecting a local station to said electric energy feeding source for closing and opening said power bus, and second switching means being mounted in said power bus interconnecting said central unit and said central unit and said electric energy feeding source for closing and opening this latter power bus, a voltage divider circuit being associated with each local station and mounted between positive and negative terminals of said feeding source, in series relationship with a switching element to be actioned for switching on said local station, each said divider circuit having a dividing terminal coupled to an electrical potential detecting device coupled to all local stations, the electrical potential of said dividing terminal being changeable between a first value when said corresponding switching element is not actioned and a second value when said corresponding switching element has been actioned to demand accomplishing of a function by said respective local station;

said second value being detectable by said detecting device and causing said detecting device to produce a control signal for closing at least said first switching means mounted in the power bus interconnecting said power source to said respective local station, the switching element of which had been actioned for ensuring power feeding thereto, and said second switching means provided in the power bus interconnecting said power source to said central unit for ensuring power feeding thereto and for enabling it to communicate with said respective local station in order to put it in condition to accomplish its function by controlling its working device.

2. Electrical energy feeding device according to claim 1, wherein said voltage dividing circuit comprises resistances connected in series between said positive terminal of said feeding source and said switching elements, at least one of said resistances being mounted in parallel to said switching means provided in the power bus connecting said feeding source to said local stations.

3. Electrical energy feeding device according to claim 1, wherein said switching means provided in said power bus connecting said feeding source to said central unit is controlled by said detecting device control signal.

4. Electrical energy feeding device according to claim 3, wherein said switching means provided in said local station power feeding bus are adapted to be attached by said control signal produced by the detector device directly or by means of said control unit having received said control signal.

5. Electrical energy feeding device according to claim 1, wherein said central unit is connected to each said local station by a multiplexed data bus.

6. Electrical energy feeding device according to claim 1, wherein said electrical potential detecting means is formed by a comparator comparing the potential of said dividing terminal with a reference potential.

7. Electrical energy feeding device according to claim 1, wherein said switching means and said switching element are in open position when said feeding device is in a state of rest and said detecting device are permanently fed with electrical energy.

8. Electrical energy feeding device according to claim 2, wherein said voltage dividing circuit comprises a series connection of a first resistor coupled to the positive terminal of said feeding source and a second resistor connected to the negative terminal of said feeding source, a common point of said resistors being said dividing terminal and resistance ratio of the first and the second resistors being high.

9. Electrical energy feeding device according to claim 1, wherein for placing the device in the state of rest, the central unit sends a control signal for opening the switching means provided in the central unit power bus and the corresponding local station power bus.

10. The device of claim 8, wherein said resistance ratio is about 100.

11. The device of claim 1, wherein the accessory device opens or closes a window or locks or unlocks a door of the vehicle.

12. The device of claim 2, wherein said dividing terminal is a common terminal to both said resistances.

13. The device of claim 1, wherein said central unit is fed with electrical energy and by closing said switching means in said power bus only after said respective switching element has been actioned.

14. Electric energy feeding device for feeding electric energy to a system mounted on board a vehicle and comprising a contact control unit and a plurality of local stations each connected to said central unit and controlled thereby and to which are associated means for controlling a working device such as an accessory device of the vehicle, said central unit and each said local station being coupled to an electric power feeding source such as a battery by a respective power bus, first switching means being mounted in each said power bus interconnecting said power source to a local station for closing and opening the power bus and second switching means being mounted in said power bus interconnecting said power source to said central unit for closing and opening said power bus, a voltage divider circuit being associated with each said local station and mounted between positive and negative terminals of said power source, in series relationship with a switching element to be actioned for switching on said local station, each said divider circuit having a dividing terminal coupled to an electric potential detecting device coupled to all local stations, the electrical potential of said dividing terminal being changeable between a first value when said corresponding switching element is not actioned and a second value when said corresponding switching element has been actioned to demand accomplishing of a function by said respective local station, said second value being detectable by said detecting device and causing said detecting device to produce a control signal for closing at least said first switching means provided in the power bus interconnecting said power source to said respective local station the switching element of which has been actioned for ensuring power feeding thereto and for closing said second switching means provided in the power bus interconnecting said power source to said central unit for ensuring power feeding thereto, said voltage dividing circuit comprising resistances connected in series between said positive terminal of said power source and said switching element, at least one of said resistances being mounted in parallel to said switching means provided in the power bus connecting said power source to said local station, said voltage dividing circuit comprising a series connection of a first resistor coupled to the positive terminal of said power source and a second resistor connected to the negative terminal of said power source, the connection of said first resistor to said second resistor being said dividing terminal and the resistance ratio of said first and second resistors being high.

15. Electric energy feeding device according to claim 14, wherein said voltage divider circuit comprising said switching element associated to each local station is separated from the power bus for feeding electrical energy to the local station from said power source.

16. Method for feeding electrical power to a system mounted on board a vehicle and comprising a central control unit and a plurality of local stations to each of which are associated means for controlling a working device such as a device for opening or closing a window or locking or unlocking a door of the vehicle, said central unit and each local station being connectable to an electric power feeding source such as a battery and each local station being provided with a switching element for activating the local station in order to cause it to control its working device for accomplishing a function, said method comprising the steps of holding said central unit and each local station disconnected from said power source when no local station activating switch element is actioned, actioning the switching element of the local station which is desired to be activated for accomplishing a function, causing the connection of the local station the switching element of which has been actioned to said power source for ensuring power feeding thereto, causing the connection of said central unit to said power source for ensuring power feeding thereto and putting it into condition to communicate with the local stations by means of a data bus, causing said central unit to communicate with said activated local station in order to transmit thereto the data for putting it into condition to accomplish the demanded function through its working device, causing the activated local station to control its working device in view to the accomplishment of said demanded function, and causing said central unit, for putting the device in state of rest, to disconnect said at least one local station from said power source and then to disconnect itself from said power source.

* * * * *

UNITED STATES PATENT AND TRADEMARK OFFICE
CERTIFICATE OF CORRECTION

PATENT NO. : 4,948,986

DATED : August 14, 1990

INVENTOR(S) : Jean-Michel Clique

It is certified that error appears in the above—identified patent and that said Letters Patent is hereby corrected as shown below:

On the title page:

[73] Assignees: Automobiles Peugeot; Automobiles Citroen and Regie Nationale des Usines Renault, all of France Signed and Sealed this Twenty-ninth Day of January, 1991

*Attest:*

HARRY F. MANBECK, JR.

*Attesting Officer*    *Commissioner of Patents and Trademarks*